United States Patent
Watanabe et al.

(10) Patent No.: US 11,415,022 B2
(45) Date of Patent: Aug. 16, 2022

(54) OIL CONSOLE EQUIPMENT, ROTARY MACHINE PROVIDED WITH OIL CONSOLE EQUIPMENT, AND METHOD FOR RECOVERING LUBRICATION OIL CONTAINED IN EXHAUST GAS

(71) Applicant: MITSUBISHI HEAVY INDUSTRIES COMPRESSOR CORPORATION, Tokyo (JP)

(72) Inventors: Takuya Watanabe, Hiroshima (JP); Yusuke Kato, Hiroshima (JP); Tomoaki Takeda, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 973 days.

(21) Appl. No.: 16/094,855

(22) PCT Filed: Sep. 20, 2016

(86) PCT No.: PCT/JP2016/077690
§ 371 (c)(1),
(2) Date: Oct. 18, 2018

(87) PCT Pub. No.: WO2018/055672
PCT Pub. Date: Mar. 29, 2018

(65) Prior Publication Data
US 2019/0120086 A1    Apr. 25, 2019

(51) Int. Cl.
*F01D 25/18*    (2006.01)
*F01D 25/12*    (2006.01)
(Continued)

(52) U.S. Cl.
CPC ............ *F01D 25/18* (2013.01); *F01D 25/125* (2013.01); *F01D 25/20* (2013.01); *F16N 31/00* (2013.01);
(Continued)

(58) Field of Classification Search
CPC ..... F01D 25/18; F01D 25/20; B01D 19/0031; B01D 53/22; B01D 53/228; F16N 31/00; F16N 39/02; F16N 11/00
See application file for complete search history.

(56) References Cited

U.S. PATENT DOCUMENTS 4,240,908 A * 12/1980 Swain ................. B01D 17/045
                                                       210/708
4,714,139 A * 12/1987 Lorenz .................... F16N 39/06
                                                       184/6.24
(Continued)

FOREIGN PATENT DOCUMENTS

JP    S47-013775 U    10/1972
JP    S54-013073 A     1/1979
(Continued)

OTHER PUBLICATIONS

International Search Report issued in corresponding International Patent Application No. PCT/JP2016/077690, dated Nov. 8, 2016 (4 pages).
(Continued)

*Primary Examiner* — Michael R Mansen
*Assistant Examiner* — Mark K Buse
(74) *Attorney, Agent, or Firm* — Osha Bergman Watanabe & Burton LLP

(57) ABSTRACT

Oil console equipment includes: a lubrication oil tank in which a lubrication oil is stored; a lubrication oil supply line which is connected to the lubrication oil tank and through which a liquid lubrication oil stored in the lubrication oil
(Continued)

tank is supplied to a bearing supporting a rotor; a first cooler which is provided in the lubrication oil supply line and cools the liquid lubrication oil supplied to the bearing; a lubrication oil recovery line which is connected to the lubrication oil tank and through which the lubrication oil recovered from the bearing is introduced into the lubrication oil tank; a first atmosphere discharge pipe which is connected to the lubrication oil tank and through which a lubrication oil mist which exists in a gas phase in the lubrication oil tank and is a misted lubrication oil and a first exhaust gas containing a gas are introduced out.

11 Claims, 7 Drawing Sheets

(51) Int. Cl.
  *F16N 31/00* (2006.01)
  *F16N 39/02* (2006.01)
  *F01D 25/20* (2006.01)
(52) U.S. Cl.
  CPC .......... *F16N 39/02* (2013.01); *F05D 2260/98* (2013.01); *F16N 2210/02* (2013.01); *F16N 2210/14* (2013.01); *F16N 2210/18* (2013.01)

(56) References Cited

U.S. PATENT DOCUMENTS

| | | | | |
|---|---|---|---|---|
| 4,770,792 | A * | 9/1988 | Newton | B01D 17/04 210/708 |
| 4,892,667 | A * | 1/1990 | Parker, III | C10M 175/04 210/DIG. 5 |
| 5,037,562 | A * | 8/1991 | Tarves, Jr. | B01D 61/145 210/780 |
| 5,803,715 | A * | 9/1998 | Kitchener | F04B 39/16 417/313 |
| 5,954,955 | A * | 9/1999 | Mori | B01D 17/0205 210/260 |
| 5,992,518 | A * | 11/1999 | Whitlock | B01D 29/54 210/458 |
| 6,893,478 | B2 * | 5/2005 | Care | F01M 13/04 55/401 |
| 7,497,889 | B2 * | 3/2009 | Furukawa | F01N 3/01 60/275 |
| 7,900,749 | B2 * | 3/2011 | Regonini | B01D 45/14 55/337 |
| 9,168,475 | B2 * | 10/2015 | Dorao | B01D 45/14 |
| 9,587,560 | B2 * | 3/2017 | Beier | F02C 7/06 |
| 10,746,177 | B2 * | 8/2020 | Collins | F25B 5/02 |
| 2004/0261374 | A1 * | 12/2004 | Bailey | F01N 3/0235 55/302 |
| 2006/0276619 | A1 | 12/2006 | Heckmann et al. | |
| 2008/0295695 | A1 * | 12/2008 | Takeuchi | A01G 25/02 96/108 |
| 2012/0211408 | A1 * | 8/2012 | Hopkins | B01D 46/2411 210/232 |
| 2016/0376922 | A1 * | 12/2016 | Belfield | F01D 25/18 60/39.08 |

FOREIGN PATENT DOCUMENTS

| | | |
|---|---|---|
| JP | S57-184729 U | 11/1982 |
| JP | 2002-273151 A | 9/2002 |
| JP | 2006-283675 A | 10/2006 |
| JP | 2006-523135 A | 10/2006 |
| JP | 2007-021477 A | 2/2007 |
| JP | 5237433 B2 | 7/2013 |

OTHER PUBLICATIONS

Written Opinion of the International Searching Authority issued in corresponding International Patent Application No. PCT/JP2016/077690, dated Nov. 8, 2016 (17 pages).

* cited by examiner

OIL CONSOLE EQUIPMENT, ROTARY MACHINE PROVIDED WITH OIL CONSOLE EQUIPMENT, AND METHOD FOR RECOVERING LUBRICATION OIL CONTAINED IN EXHAUST GAS

TECHNICAL FIELD

The present invention relates to oil console equipment which circulates a lubrication oil, a rotary machine provided with oil console equipment, and a method for recovering a lubrication oil contained in an exhaust gas.

BACKGROUND ART

In the related art, oil console equipment supplies a lubrication oil to a compressor and a bearing of a rotor of equipment (motor/gear, steam turbine, or the like) for driving a compressor. In the oil console equipment, the lubrication oil having an increased temperature in the bearing is recovered, the recovered lubrication oil is cooled, and thereafter, the cooled lubrication oil is supplied to the bearing again.

The oil console equipment includes a lubrication oil tank which stores the lubrication oil, a supply pipe through which the lubrication oil in the lubrication oil tank pumped by a pump is supplied to the bearing of the rotor, a drain pipe through which the lubrication oil is recovered to the lubrication oil tank, and an atmosphere discharge pipe which is provided to communicate with a ceiling portion of the lubrication oil tank. The oil console equipment having the above-described configuration forcibly discharges a gas (hereinafter, referred to as an "exhaust gas") in the lubrication oil tank to the atmosphere by a suction device which is provided in the atmosphere discharge pipe.

The lubrication oil has a saturated steam pressure, and the lubrication oil tank and a bearing box are not 100% filled with a liquid lubrication oil.

Accordingly, in a state where both a liquid phase of the lubrication oil and a gas phase of the gas (for example, $N_2$ or the like) are present, the lubrication oil and the gas are balanced between the liquid phase and the gas phase.

Accordingly, a gas-liquid equilibrium component of the lubrication oil is contained in the gas phase in a gas state. In addition, if a temperature of the lubrication oil as a liquid increases, the saturated steam pressure increases, and thus, a gas component of the lubrication oil contained in the gas phase increases.

If the lubrication oil is used as a lubricant of the bearing, the lubrication oil takes away heat generated by the bearing to cool the bearing. Accordingly, the temperature of the lubrication oil on an outlet side increases, and a temperature of the gas existing in the bearing increases together with the lubrication oil. In this case, the lubrication oil is stirred by the rotor rotating at a high speed, and thus, a portion of the lubrication oil is misted.

In addition, if the gas is discharged to the atmosphere as the exhaust gas, the misted lubrication oil is discharged to the atmosphere together with the exhaust gas, and thus, there is a possibility that recovery efficiency of the lubrication oil decreases. In addition, in a case where an obstacle exists near the atmosphere discharge pipe, the misted lubrication oil is attached to the obstacle, and there is a possibility that an environment around the obstacle is contaminated.

Patent Document 1 discloses oil console equipment having a lubrication oil injection device which injects a lubrication oil of cooled droplets to a misted lubrication oil passing through an atmosphere discharge pipe.

In addition, Patent Document 1 discloses that the misted lubrication oil is cooled by the lubrication oil of cooled droplets and droplets are formed.

CITATION LIST

Patent Literature

Patent Document 1: Japanese Patent No. 5237433

SUMMARY OF INVENTION

Technical Problem

Like the oil console equipment disclosed in Patent Document 1, since the lubrication oil of cooled droplets (hereinafter, referred to a "droplet lubrication oil") is injected to the exhaust gas using the lubrication oil injection device, it is possible to recover the misted lubrication oil contained in the exhaust gas to some extent.

Like the technology disclosed in Patent Document 1, if the misted lubrication oil having a smaller particle size is sprayed, heat exchange can be easily performed. However, since the mist itself of the lubrication oil rises, is likely to be discharged to the atmosphere.

If the particle size of the mist of the sprayed lubrication oil increases, the mist of the sprayed lubrication oil does not easily rise. However, since a contact surface area between the mist of the lubrication oil and a gas (for example, a vent gas) decreases, there is a possibility that heat exchange is not easily performed.

Accordingly, the present invention relates to oil console equipment, a rotary machine provided with oil console equipment, and a method for recovering a lubrication oil contained in an exhaust gas capable of preventing a misted lubrication oil contained in the exhaust gas passing through an atmosphere discharge pipe from being discharged to the atmosphere and increasing recovery efficiency of the misted lubrication oil.

Solution to Problem

According to a first aspect of the present invention, oil console equipment is provided, including: a lubrication oil tank in which a lubrication oil is stored; a lubrication oil supply line which is connected to the lubrication oil tank and through which a liquid lubrication oil stored in the lubrication oil tank is supplied to a bearing supporting a rotor; a first cooler which is provided in the lubrication oil supply line and cools the liquid lubrication oil supplied to the bearing; a lubrication oil recovery line which is connected to the lubrication oil tank and through which the lubrication oil recovered from the bearing is introduced into the lubrication oil tank; a first atmosphere discharge pipe which is connected to the lubrication oil tank and through which a lubrication oil mist which exists in a gas phase in the lubrication oil tank and is a misted lubrication oil and a first exhaust gas containing a gas are introduced out; a first lubrication oil mist collection device which includes a first tubular member which is provided in a state of being coupled to the first atmosphere discharge pipe and extends in a vertical direction and a first lubrication oil collection portion which is disposed in a space formed in the first tubular member to collect the lubrication oil mist and through which the gas is capable of passing; and a first cooling lubrication oil supply line which branches off from the lubrication oil supply line positioned on a downstream side of the first cooler and includes a discharge port disposed in the first tubular member and through which a cooled liquid lubrication oil is supplied to an upper end of the first lubrication oil collection portion via the discharge port, in which the first lubrication oil collection portion causes the cooled liquid lubrication oil moving from the upper end of the first lubrication oil collection portion to a lower end thereof and the first exhaust gas moving from the lower end of the first lubrication oil collection portion to the upper end thereof to come into gas-liquid contact with each other.

According to this configuration, it is possible to enhance a probability that the cooled liquid lubrication oil moving downward while being attached to the surface of the first lubrication oil collection portion when the cooled liquid lubrication oil is supplied from the upper end side of the first lubrication oil collection portion and the first exhaust gas (gas) come into gas-liquid contact with each other. Accordingly, most of the first exhaust gas is cooled by the cooled liquid lubrication oil, and most of the lubrication oil mist contained in the first exhaust gas can be made into droplets so as to be recovered. That is, it is possible to increase recovery efficiency of the lubrication oil mist contained in the first exhaust gas.

In addition, since the lubrication oil supplied to the upper end of the first lubrication oil collection portion is cooled using the first cooler which cools the lubrication oil supplied to the bearing, it is possible to cool the lubrication oil which cools the first exhaust gas by providing only the first cooling lubrication oil supply line branching off from the lubrication oil recovery line without providing a cooler separately.

In addition, the liquid lubrication oil having a low temperature due to cooling is supplied from the upper end of the first lubrication oil collection portion, the gas (for example, a vent gas at approximately 60° C. to 70° C.) is positively cooled by the liquid lubrication oil, and the temperature of the gas decreases. Accordingly, by returning the gas of the lubrication oil which became unable to exist as a gas due to gas-liquid equilibrium to a liquid state and attaching the lubrication oil mist which is extremely fine and could not be removed so far, the mist diameter of the lubrication oil increases so that it can be removed.

In the oil console equipment according to a second aspect of the present invention, the first lubrication oil collection portion may include a plurality of first filling members, and the plurality of first filling members may be disposed in the space in the first tubular member in a state where a gap is interposed therebetween such that the upper end side of the first lubrication oil collection portion is not viewed when viewed from the lower end side of the first lubrication oil collection portion.

According to this configuration, it is possible to further enhance a probability that the cooled liquid lubrication oil attached to the plurality of first filling members and the first exhaust gas come into gas-liquid contact with each other.

In the oil console equipment according to a third aspect of the present invention, the oil console equipment may further include a second cooler which is provided in the first cooling lubrication oil supply line and further cools the lubrication oil cooled by the first cooler.

According to this configuration, since the second cooler is provided, the temperature of the liquid lubrication oil which cools the first exhaust gas further decreases, and thus, it is possible to enhance effects of cooling the first exhaust gas by the liquid lubrication oil. Therefore, since more lubrication oil mist can be made into droplets, it is possible to further increase the recovery efficiency of the lubrication oil mist.

In the oil console equipment according to a fourth aspect of the present invention, the oil console equipment may further include a fan which is provided in the first atmosphere discharge pipe positioned between the lubrication oil tank and the first lubrication oil mist collection device, a lubrication oil mist recovery line which branches off from the first atmosphere discharge pipe positioned between the first lubrication oil mist collection device and the fan and is connected to the lubrication oil tank, and an orifice which is provided in the lubrication oil mist recovery line.

In this way, since the fan is provided in the first atmosphere discharge pipe positioned between the lubrication oil tank and the first lubrication oil mist collection device, the lubrication oil mist generated in the bearing can be introduced to the lubrication oil tank in a gas phase via the lubrication oil recovery line. Accordingly, the lubrication oil mist generated in the bearing can be recovered into the lubrication oil tank without separately providing the atmosphere discharge pipe through which the exhaust gas including the lubrication oil mist generated in the bearing is discharged to the atmosphere and the lubrication oil mist collection device which collects the lubrication mist contained in the exhaust gas flowing through the atmosphere discharge pipe.

Moreover, since the lubrication oil mist recovery line which branches off from the first atmosphere discharge pipe positioned between the first lubrication oil mist collection device and the fan and the orifice which is provided in the lubrication oil mist recovery line are provided, the liquid lubrication oil can be recovered into the lubrication oil tank via the lubrication oil mist recovery line and the orifice without passing through the fan.

In the oil console equipment according to a fifth aspect of the present invention, the oil console equipment may further include a second atmosphere discharge pipe which is connected to the bearing and through which a lubrication oil mist which is a misted lubrication oil and a second exhaust gas containing a gas are discharged to the atmosphere, a second lubrication oil mist collection device which includes a second tubular member having both ends coupled to a separate portion of the second atmosphere discharge pipe and a second lubrication oil collection portion which is disposed in a predetermined region of a space formed in the second tubular member to collect the lubrication oil mist and through which the gas is capable of passing, and a second cooling lubrication oil supply line which branches off from the first cooling lubrication oil supply line and includes a discharge port disposed in the second tubular member and through which the cooled liquid lubrication oil is supplied to an upper end of the second lubrication oil collection portion via the discharge port.

According to this configuration, it is possible to enhance a probability that the cooled liquid lubrication oil moving downward while being attached to the surface of the second lubrication oil collection portion when the cooled liquid lubrication oil is supplied from the upper end side of the second lubrication oil collection portion and the second exhaust gas (gas) come into gas-liquid contact with each other. Accordingly, since most of the second exhaust gas is cooled by the cooled liquid lubrication oil, most of the lubrication oil mist contained in the second exhaust gas can be made into droplets so as to be recovered, and thus, it is possible to increase recovery efficiency of the lubrication oil mist contained in the second exhaust gas.

In addition, since the liquid lubrication oil supplied to the upper end of the second lubrication oil collection portion is cooled using the first cooler which cools the lubrication oil supplied to the bearing, it is possible to cool the lubrication oil which cools the second exhaust gas by providing only the second cooling lubrication oil supply line branching without providing a cooler separately.

In the oil console equipment according to a sixth aspect of the present invention, the second lubrication oil collection portion may include a plurality of second filling members, and the plurality of second filling members may be disposed in a predetermined region in the second tubular member in a state where a gap is interposed therebetween such that the upper end side of the second lubrication oil collection portion is not viewed when viewed from a lower end side of the second lubrication oil collection portion.

According to this configuration, it is possible to further enhance a probability that the cooled liquid lubrication oil attached to the plurality of second filling members and the second exhaust gas come into gas-liquid contact with each other.

In the oil console equipment according to a seventh aspect of the present invention, a second cooler may be provided in the first cooling lubrication oil supply line, and the second cooling lubrication oil supply line may branch off from the first cooling lubrication oil supply line positioned between the first lubrication oil mist collection device and the second cooler.

In this way, since the second cooling lubrication oil supply line branching off from the first cooling lubrication oil supply line positioned between the first lubrication oil mist collection device and the second cooler is provided, it is possible to supply the lubrication oil cooled by the first and second coolers to the upper end side of the second lubrication oil collection portion.

According to an eighth aspect of the present invention, a rotary machine provided with oil console equipment is provided, including: the oil console equipment; and a rotary machine which includes the rotor and the bearing.

In the rotary machine provided with oil console equipment having the above-described having, it is possible to enhance recovery efficiency of the lubrication oil mist contained in the first exhaust gas.

According to a ninth aspect of the present invention, a method for recovering a lubrication oil contained in an exhaust gas in oil console equipment is provided, including: a step of cooling the liquid lubrication oil introduced out from a lubrication oil tank in which a lubrication oil is stored and supplying the cooled liquid lubrication oil from an upper end side of a first lubrication oil collection portion, which fills a predetermined region of a space in a first tubular member coupled to a first atmosphere discharge pipe connected to a gas phase of the lubrication oil tank, into the first lubrication oil collection portion; a step of introducing a lubrication oil mist which is a misted lubrication oil and a first exhaust gas containing a gas from a gas phase in the lubrication oil tank into the first atmosphere discharge pipe, and supplying the first exhaust gas from a lower end side of the first lubrication oil collection portion to the first lubrication oil collection portion; and a step of causing the cooled liquid lubrication oil and the first exhaust gas to come into gas-liquid contact with each other in the first lubrication oil collection portion, forming droplets of the lubrication oil mist contained in the first exhaust gas to recover the lubrication oil mist, and causing the gas contained in the first exhaust gas to pass through the upper end side of the first lubrication oil collection portion.

By using this method, it is possible to enhance a probability that the cooled liquid lubrication oil moving downward while being attached to the surface of the first lubrication oil collection portion when the cooled lubrication oil is supplied from the upper end side of the first lubrication oil collection portion and the first exhaust gas (gas) come into gas-liquid contact with each other. Accordingly, most of the first exhaust gas is cooled by the cooled lubrication oil, and most of the lubrication oil mist contained in the first exhaust gas can be made into droplets so as to be recovered. That is, it is possible to increase recovery efficiency of the lubrication oil mist contained in the first exhaust gas.

In addition, the liquid lubrication oil having a low temperature due to cooling is supplied from the upper end of the first lubrication oil collection portion, the gas (for example, a vent gas at approximately 60° C. to 70° C.) is positively cooled by the liquid lubrication oil, and the temperature of the gas decreases. Accordingly, by returning the gas of the lubrication oil which became unable to exist as a gas due to gas-liquid equilibrium to a liquid state and attaching the lubrication oil mist which is extremely fine and could not be removed so far, the mist diameter of the lubrication oil increases so that it can be removed.

In the method for recovering a lubrication oil contained in an exhaust gas according to a tenth aspect of the present invention, in the step of supplying the first exhaust gas, the first exhaust gas may be supplied to the first lubrication oil collection portion using a fan provided in the first atmosphere discharge pipe, and in the step of recovering the lubrication oil mist, the cooled oil containing the lubrication oil mist may be recovered via a lubrication oil mist recovery line which branches off from the first atmosphere discharge pipe positioned between the first lubrication oil collection portion and the fan.

In this way, since the fan is provided in the first atmosphere discharge pipe positioned between the lubrication oil tank and the first lubrication oil mist collection device, the lubrication oil mist generated in the bearing can be introduced to the lubrication oil tank in a gas phase via the lubrication oil recovery line. Accordingly, the lubrication oil mist generated in the bearing can be recovered into the lubrication oil tank without separately providing the atmosphere discharge pipe through which the exhaust gas including the lubrication oil mist generated in the bearing is discharged to the atmosphere and the lubrication oil mist collection device which collects the lubrication mist contained in the exhaust gas flowing through the atmosphere discharge pipe.

Moreover, since the lubrication oil mist recovery line which branches off from the first atmosphere discharge pipe positioned between the first lubrication oil mist collection device and the fan and the orifice which is provided in the lubrication oil mist recovery line are provided, the liquid lubrication oil can be recovered into the lubrication oil tank via the lubrication oil mist recovery line and the orifice without passing through the fan.

In the method for recovering a lubrication oil contained in an exhaust gas according to an eleventh aspect of the present invention, the method further includes a step of cooling the liquid lubrication oil introduced out from the lubrication oil tank in which a lubrication oil is stored and supplying a portion of the cooled liquid lubrication oil from an upper end side of a second lubrication oil collection portion, which fills a predetermined region of a space formed in a second tubular member coupled to a second atmosphere discharge pipe connected to a bearing, into the second lubrication oil collection portion, a step of introducing the lubrication oil mist which is the misted lubrication oil and a second exhaust gas containing a gas from the bearing into the second atmosphere discharge pipe, and supplying the second exhaust gas from a lower end side of the second lubrication oil collection portion to the second lubrication oil collection portion, and a step of causing the cooled liquid lubrication oil and the second exhaust gas to come into gas-liquid contact with each other in the second lubrication oil collection portion, forming droplets of the lubrication oil mist contained in the second exhaust gas to recover the lubrication oil mist, and causing the gas contained in the second exhaust gas to pass through the upper end side of the second lubrication oil collection portion.

By using this method, it is possible to enhance a probability that the cooled liquid lubrication oil moving downward while being attached to the surface of the second lubrication oil collection portion when the cooled lubrication oil is supplied from the upper end side of the second lubrication oil collection portion and the second exhaust gas (gas) come into gas-liquid contact with each other. Accordingly, most of the second exhaust gas is cooled by the cooled lubrication oil and most of the lubrication oil mist contained in the second exhaust gas can be made into droplets so as to be recovered. That is, it is possible to increase recovery efficiency of the lubrication oil mist contained in the second exhaust gas.

Advantageous Effects of Invention

According to the present invention, it is possible to enhance the recovery efficiency of the misted lubrication oil contained in the exhaust gas passing through the atmosphere discharge pipe.

DESCRIPTION OF EMBODIMENTS

First Embodiment

Figure 1:
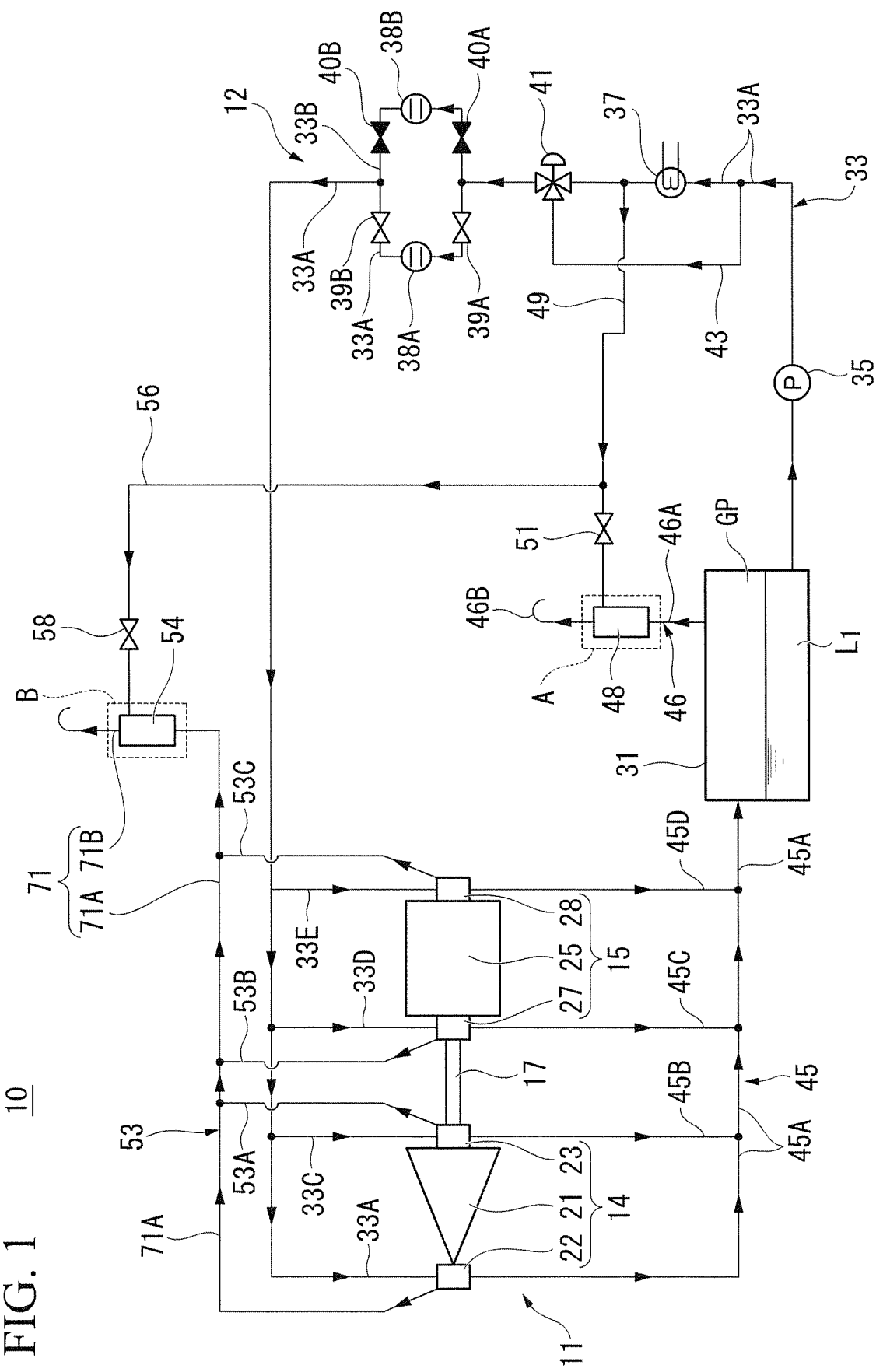
FIG. 1 is a diagram schematically showing a schematic configuration of a rotary machine provided with oil console equipment according to a first embodiment of the present invention.

FIG. 1 is a diagram schematically showing a schematic configuration of a rotary machine provided with oil console equipment according to a first embodiment of the present invention. In FIG. 1, a reference numeral A indicates a region (hereinafter, referred to a "region A") which surrounds a first lubrication oil mist collection device 48, a portion of a first cooling lubrication oil supply line 49, and a portion of a first atmosphere discharge pipe 46. In addition, a reference numeral B shown in FIG. 1 indicates a region (hereinafter, referred to a "region B") including a second lubrication oil mist collection device 54, a portion of a second atmosphere discharge pipe 53, and a portion of a second cooling lubrication oil supply line 56.

Referring to FIG. 1, a rotary machine 10 provided with oil console equipment of the first embodiment includes a rotary machine 11 and oil console equipment 12.

The rotary machine 11 includes a driver 14 and a compressor 15 which are a rotor and a rotary shaft 17. The driver 14 includes a driver body 21 and bearings 22 and 23. The bearing 22 is disposed on one end portion of the driver body 21. The bearing 23 is disposed on the other end portion of the driver body 21. The bearings 22 and 23 rotatably support the driver body 21.

For example, each of the bearings 22 and 23 can be a radial bearing or a thrust bearing.

The driver 14 having the above-described configuration rotationally drives the compressor 15 via the rotary shaft 17. For example, as the driver 14, an electric motor, a steam turbine, or the like can be used.

The compressor 15 includes a compressor body 25 and bearings 27 and 28. The bearing 27 is disposed on one end portion of the compressor body 25. The bearing 28 is disposed on the other end portion of the compressor body 25. The bearings 27 and 28 rotatably support the compressor body 25. From the viewpoint of preventing steam or a gas which is a working fluid from entering the bearings 27 and 28, a separation gas such as $N_2$ gas is introduced into the bearings 27 and 28.

For example, a centrifugal compressor can be used as the compressor 15.

The rotary shaft 17 couples the driver 14 and the compressor 15 to each other. The rotary shaft 17 transmits power generated by the driver 14 to the compressor 15.

The oil console equipment 12 includes a lubrication oil tank 31, a lubrication oil supply line 33, a pump 35, a first cooler 37, filters 38A and 38B, a temperature control valve 41, a bypass line 43, a lubrication oil recovery line 45, a first atmosphere discharge pipe 46, a first lubrication oil mist collection device 48, a first cooling lubrication oil supply line 49, valves 51 and 58, a second atmosphere discharge pipe 53, a second lubrication oil mist collection device 54, and a second cooling lubrication oil supply line 56.

The lubrication oil tank 31 is a tank for storing a lubrication oil $L_1$, and a gas phase GP is formed above the lubrication oil $L_1$. A lower portion of the lubrication oil tank 31 is connected to one end of the lubrication oil supply line 33. An upper portion of the lubrication oil tank 31 is connected to the other end of the lubrication oil recovery line 45.

The lubrication oil $L_1$ is supplied from the lubrication oil tank 31 to the bearings 22, 23, 27, and 28 via the lubrication oil supply line 33. In the bearings 22, 23, 27, and 28, the lubrication oil $L_1$ is stirred by the driver body 21 and the compressor body 25 rotated at a high speed, a portion of the lubrication oil $L_1$ is misted, and thus, a lubrication oil mist is generated.

Moreover, in the bearings 22 and 23, from the viewpoint of preventing steam or a gas which is the working fluid from entering the bearings 22 and 23, a separation gas such as $N_2$ gas is introduced into the bearings 22 and 23. Accordingly, in the bearings 22, 23, 27, and 28, a second exhaust gas including the above-described separation gas such as $N_2$ gas and the lubrication oil mist is generated.

A portion of the second exhaust gas is returned to the gas phase GP in the lubrication oil tank 31 together with a liquid lubrication oil $L_1$ via the lubrication oil recovery line 45. Accordingly, the gas phase GP becomes a gas phase including the second exhaust gas. In the following descriptions, an exhaust gas including a gas constituting the gas phase GP and the lubrication oil mist is referred to as a first exhaust gas.

The lubrication oil supply line 33 includes a line body 33A and branch lines 33B to 33E. In the line body 33A, one end (one end of the lubrication oil supply line 33) is connected to the lower portion of the lubrication oil tank 31, and the other end is connected to the bearing 22. A portion of the liquid lubrication oil $L_1$ introduced out from the inside of the lubrication oil tank 31 is supplied to the bearing 22 through the line body 33A.

The branch line 33B branches off from the line body 33A positioned on a downstream side of the temperature control valve 41 and a tip end of the branch line 33B is connected to the line body 33A positioned on a downstream side of a branching position of the branch line 33B.

The branch line 33C branches off from the line body 33A positioned on a downstream side of the branch line 33B. A tip end of the branch line 33C is connected to the bearing 23. A portion of the liquid lubrication oil $L_1$ introduced out from the inside of the lubrication oil tank 31 is supplied to the bearing 23 through the branch line 33C.

The branch line 33D branches off from the line body 33A positioned on a downstream side of the branch line 33B on an upstream side of a branching position of the branch line 33C. A tip end of the branch line 33D is connected to the bearing 27. A portion of the liquid lubrication oil $L_1$ introduced out from the inside of the lubrication oil tank 31 is supplied to the bearing 27 through the branch line 33D.

The branch line 33E branches off from the line body 33A positioned on a downstream side of the branch line 33B on an upstream side of a branching position of the branch line 33D. A tip end of the branch line 33E is connected to the bearing 28. A portion of the liquid lubrication oil $L_1$ introduced out from the inside of the lubrication oil tank 31 is supplied to the bearing 28 through the branch line 33E.

The pump 35 is provided in the line body 33A which is positioned on an upstream side of the branching position of the branch line 33B. The pump 35 feeds the lubrication oil $L_1$ in the lubrication oil tank 31 to the bearings 22, 23, 27, and 28 via the lubrication oil supply line 33.

The first cooler 37 is provided in the line body 33A which is positioned between the pump 35 and the branching position of the branch line 33B. The first cooler 37 cools the liquid lubrication oil $L_1$ flowing through the line body 33A. For example, in a case where a temperature of the lubrication oil $L_1$ is 60° C., the first cooler 37 cools the liquid lubrication oil $L_1$ such that the temperature of the lubrication oil $L_1$ is approximately 45° C.

The filter 38A is provided in the line body 33A which is positioned between the branching position of the branch line 33B and the tip end of the branch line 33B. The filter 38B is provided in the branch line 33B.

The valve 39A is provided in the branch line 33A which is positioned on an upstream side of the filter 38A. The valve 39B is provided in the branch line 33A which is provided on a downstream side of the filter 38A.

The valve 40A is provided in the branch line 33B which is positioned on an upstream side of the filter 38B. The valve 40B is provided in the branch line 33B which is positioned on a downstream side of the filter 38B.

The filters 38A and 38B are disposed in parallel, one thereof is used as a main valve, and the other thereof is used as a standby valve. That is, the filters 38A and 38B are used one by one. The filters 38A and 38B remove dust contained in the cooled liquid lubrication oil $L_1$.

The temperature control valve 41 is provided in the line body 33A which is positioned between the branching position of the branch line 33B and the first cooler 37. In three connection ports constituting the temperature control valve 41, two connection ports are connected to the line body 33A and the remaining one connection port is connected to the tip end of the bypass line 43.

The bypass line 43 branches off from the line body 33A which is positioned between the pump 35 and the first cooler 37. The lubrication oil $L_1$ having a high temperature which does not pass through the first cooler 37 flows through the bypass line 43, and the lubrication oil $L_1$ having a high temperature and the lubrication oil $L_1$ cooled by the first cooler 37 are mixed with each other in the temperature control valve 41, and thus, the temperature of the lubrication oil $L_1$ is adjusted to a predetermined temperature.

The lubrication oil recovery line 45 includes a line body 45A and branch lines 45B to 45D. One end (one end of the lubrication oil recovery line 45) of the line body 45A is connected to the bearing 22. The liquid lubrication oil $L_1$ used in the bearing 22 and a portion of the second exhaust gas generated in the bearing 22 are recovered to the lubrication oil tank 31 through the line body 45A.

The branch line 45B branches from the line body 45A and a tip end of the branch line 45B is connected to the bearing 23. The liquid lubrication oil $L_1$ used in the bearing 23 and a portion of the second exhaust gas generated in the bearing 23 are recovered to the lubrication oil tank 31 through the branch line 45B.

The branch line 45C branches off from the line body 45A positioned on a downstream side of a branching position of the branch line 45B and a tip end of the branch line 45C is connected to the bearing 27. The liquid lubrication oil $L_1$ used in the bearing 27 and a portion of the second exhaust gas generated in the bearing 27 are recovered to the lubrication oil tank 31 through the branch line 45C.

The branch line 45D branches off from the line body 45A positioned on a downstream side of a branching position of the branch line 45C and a tip end of the branch line 45D is connected to the bearing 28. The liquid lubrication oil $L_1$ used in the bearing 28 and a portion of the second exhaust gas generated in the bearing 28 are recovered to the lubrication oil tank 31 through the branch line 45D.

Figure 2:
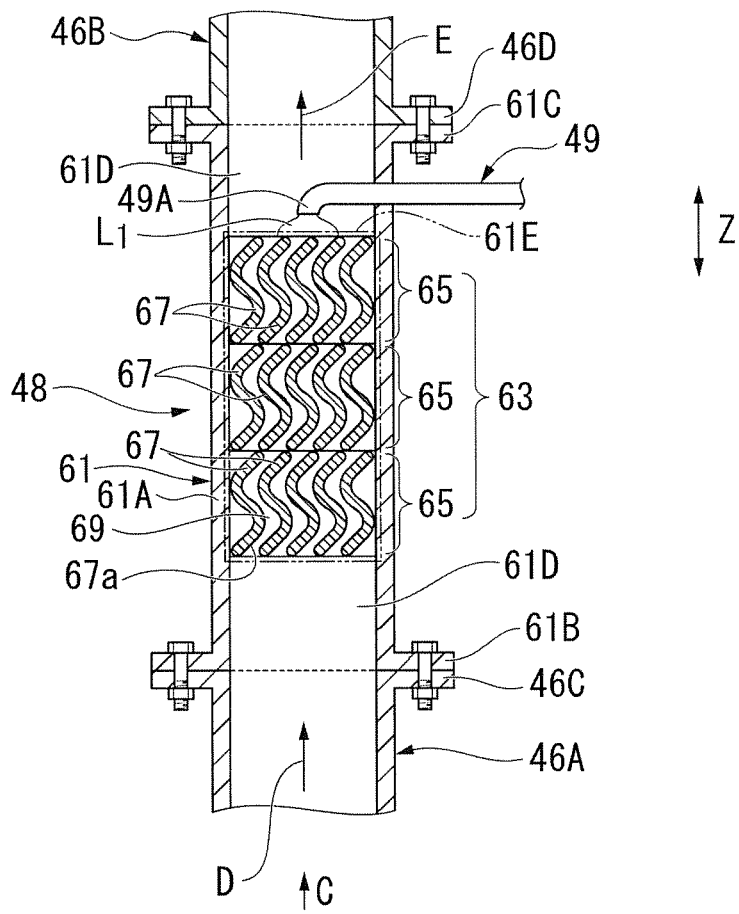
FIG. 2 is an enlarged view showing a portion surrounded by a region A in the oil console equipment shown in FIG. 1 in cross section.

FIG. 2 is an enlarged view showing a portion surrounded by a region A in the oil console equipment shown in FIG. 1 in cross section. In FIG. 2, a Z direction indicates a vertical direction. In FIG. 2, only the first and second pipe portions 46A and 46B and the first lubrication oil mist collection device 48 are shown in cross section.

In FIG. 2, a reference numeral D indicates a movement direction (hereinafter, referred to as a "D direction") of the first exhaust gas and a reference numeral E indicates a movement direction (hereinafter, referred to an "E direction") of a gas contained in the first exhaust gas. In addition, in FIG. 2, the same reference numerals are assigned to the same constituent portions as those of the structure body shown in FIG. 1. Moreover, FIG. 2 schematically shows a state where the cooled lubrication oil $L_1$ is discharged from the discharge port 49A of the first cooling lubrication oil supply line 49.

Referring to FIGS. 1 and 2, the first atmosphere discharge pipe 46 includes a first pipe portion 46A, a second pipe portion 46B, and flange portions 46C and 46D.

One end of the first pipe portion 46A is connected to an upper portion (for example, in the case of FIG. 1, an upper end of the lubrication oil tank 31) of the lubrication oil tank 31. The second pipe portion 46B is separated from the first pipe portion 46A and is disposed above the first pipe portion 46A. The other end of the second pipe portion 46B becomes an opening end through which a gas can be discharged to the atmosphere.

The flange portion 46C is provided on the other end of the first pipe portion 46A. The flange portion 46D is provided on one end of the second pipe portion 46B. In the first and second pipe portions 46A and 46B, a portion in which the first lubrication oil mist collection device 48 is disposed extends in the Z direction. The gas contained in the first exhaust gas is discharged to the atmosphere via the first lubrication oil mist collection device 48 through the first atmosphere discharge pipe 46.

The first lubrication oil mist collection device 48 includes a first tubular member 61 and a first lubrication oil collection portion 63.

The first tubular member 61 includes a tubular member body 61A and flange portions 61B and 61C. The tubular member body 61A is a tubular member having the same inner diameter and outer diameter as an inner diameter and an outer diameter of the first atmosphere discharge pipe 46 and extends in one direction. A columnar space 61D is defined inside the tubular member body 61A. The space 61D has a predetermined region 61E in which the first lubrication oil collection portion 63 is disposed. A portion of the space 61D is disposed above and below the predetermined region 61E.

The first tubular member 61 having the above-described configuration is provided in the first atmosphere discharge pipe 46 such that an extension direction of the first tubular member is the Z direction (vertical direction).

The flange portion 61B is provided on one end of the tubular member body 61A. The flange portion 61B is fastened to the flange portion 46C by a bolt and a nut. The flange portion 61C is provided on the other end of the tubular member body 61A. The flange portion 61C is fastened to the flange portion 461) by a bolt and a nut.

Accordingly, both ends of the tubular member body 61A are coupled to a separate portion of the first atmosphere discharge pipe 46 to extend in the Z direction. In addition, the tubular member body 61A is configured to be attachable or detachable with respect to the first atmosphere discharge pipe 46.

Figure 3:
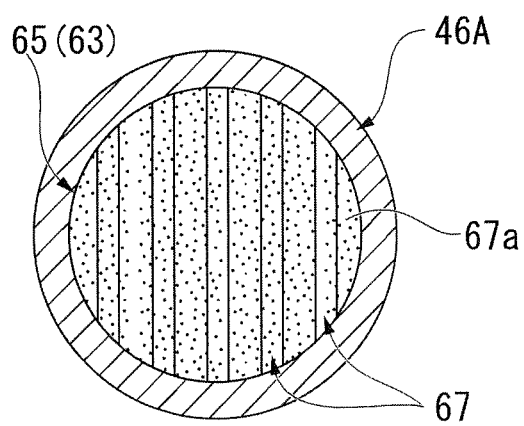
FIG. 3 is a view when a structure body shown in FIG. 2 is viewed from C.

FIG. 3 is a view when a structure body shown in FIG. 2 is viewed from C. In FIG. 3, the same reference numerals are assigned to the same constituent portions as those of the structure body shown in FIG. 2.

Referring to FIGS. 1 to 3, the first lubrication oil collection portion 63 is fixed to the predetermined region 61E formed in the first tubular member 61. The first lubrication oil collection portion 63 has a structure in which a plurality of (for example, in the case of FIG. 2, three) collection portions 65 are stacked. Accordingly, the first lubrication oil collection portion 63 extends in the Z direction.

Each of the collection portions 65 includes a plurality of filling members 67 (in this case, the plurality of first filling members). Each of the filling members 67 has a shape in which a metal plate material is curved in a wavelike shape. The filling member 67 has a surface 67a along which the cooled lubrication oil $L_1$ flows.

The plurality of filling members 67 are provided in the predetermined region 61E in a state where gaps 69 through which a gas can pass in a plane direction orthogonal to the Z direction are interposed therebetween. In this state, the plurality of filling members 67 are disposed such that a direction intersecting the Z direction becomes an extension direction thereof.

The first lubrication oil collection portion 63 configured as described above is provided in the first atmosphere discharge pipe 46, and thus, it is possible to enhance a probability that the cooled liquid lubrication oil $L_1$ moving downward while being attached to the surface (the surfaces 67a of the plurality of filling members 67) of the first lubrication oil collection portion 63 when the cooled liquid lubrication oil $L_1$ is discharged to the upper end of the first lubrication oil collection portion 63 via the first cooling lubrication oil supply line 49 and the first exhaust gas (gas) supplied from the lower end side of the first lubrication oil collection portion 63 come into gas-liquid contact with each other.

In addition, as shown in FIG. 3, the plurality of filling members 67 may be disposed in the predetermined region 61E in a state where the gaps 69 are interposed therebetween such that an upper end side of the first lubrication oil collection portion 63 is not viewed when viewed from a lower end side of the first lubrication oil collection portion 63 (when viewed from C). According to this configuration, it is possible to further enhance the probability that the cooled liquid lubrication oil $L_1$ and the first exhaust gas come into gas-liquid contact with each other.

In addition, the above-described gap 69 is a gap which is connected from the lower end of the first lubrication oil collection portion 63 to the upper end thereof. However, the gap 69 is not a gap extending in the Z direction. The gap 69 is a meandering gap in the Z direction. Since the gaps 69 are provided, the first exhaust gas and the filling members 67 can come into reliable contact with each other.

For example, as a material of the plurality of filling members 67, a metal material (for example, stainless steel) having a resistance to the gas contained in the first exhaust gas, the lubrication oil $L_1$, humidity, or the like is preferable.

In addition, in FIG. 2, for example, the case where three collection portions 65 are stacked so as to constitute the first lubrication oil collection portion 63 is described. However, the number of the collection portions 65 may be one or more, and the present invention is not limited to the case. The number of the collection portions 65 constituting the first lubrication oil collection portion 63 can be appropriately set according to a shape, a disposition density, or the like of the filling member 67.

Referring to FIGS. 1 and 2, the first cooling lubrication oil supply line 49 branches off from the line body 33A which is positioned between the first cooler 37 and the temperature control valve 41. A tip end side of the first cooling lubrication oil supply line 49 penetrates a side wall of the first tubular member 61 partitioning the space 61D positioned above the first lubrication oil collection portion 63.

The first cooling lubrication oil supply line 49 has a discharge port 49A on a tip end positioned in the first tubular member 61. The discharge port 49A is positioned above the upper end of the first lubrication oil collection portion 63. The cooled liquid lubrication oil $L_1$ is discharged from the discharge port 49A positioned at the upper end of the first lubrication oil collection portion 63 (the state shown in FIG. 2).

Figure 4:
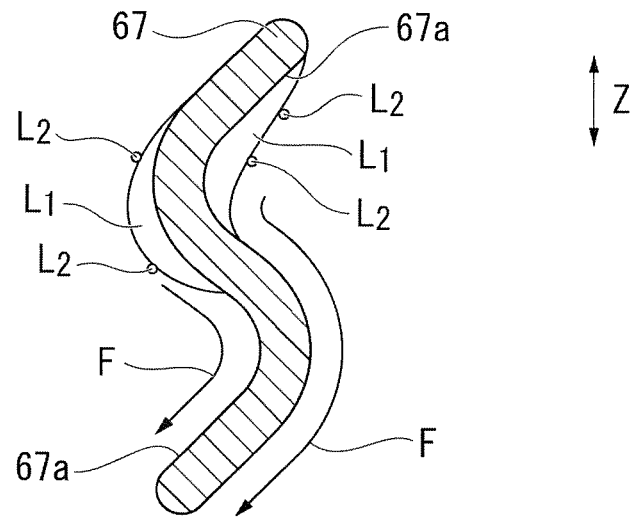
FIG. 4 is a sectional view schematically showing an aspect in which a cooled liquid lubrication oil which is attached to a surface of a filling member constituting a first lubrication oil collection portion cools a first exhaust gas.

FIG. 4 is a sectional view schematically showing an aspect in which the cooled liquid lubrication oil which is attached to the surface of the filling member constituting the first lubrication oil collection portion cools the first exhaust gas.

FIG. 4 shows only the filling member 67 in cross section. In addition, in FIG. 4, a reference numeral F indicates a flow direction (hereinafter, referred to as an "F direction") of the lubrication oil $L_1$. Moreover, in FIG. 4, the same reference numerals are assigned to the same constituent portions as those of the structure body shown in FIGS. 2 and 4.

Here, referring to FIGS. 2 and 4, a function of the cooled liquid lubrication oil $L_1$ from the discharge port 49A will be described.

If the cooled liquid lubrication oil $L_1$ is discharged from the discharge port 49A to the upper end of the first lubrication oil collection portion 63, the lubrication oil $L_1$ is attached to the surfaces 67a of the plurality of filling members 67 constituting the collection portion 65 disposed at the top.

The lubrication oil $L_1$ attached to the surfaces 67a of the plurality of filling members 67 comes into gas-liquid contact with the first exhaust gas (the exhaust gas having a temperature higher than the temperature of the cooled lubrication oil $L_1$) moving upward through the first lubrication oil collection portion 63 while moving in the F direction along the surfaces 67a, and thus, the first exhaust gas is cooled.

When the first exhaust gas is cooled, the lubrication oil mist contained in the first exhaust gas becomes droplets, the droplet lubrication oil (hereinafter, referred to as a "droplet lubrication oil $L_2$") is generated, and thus, the droplet lubrication oil $L_2$ is incorporated into the cooled liquid lubrication oil $L_1$.

The lubrication oil $L_1$ incorporating the droplet lubrication oil $L_2$ moves in the F direction, the gas-liquid contact between the droplet lubrication oil $L_2$ and the first exhaust gas is repeated, and thus, the lubrication oil mist contained in the first exhaust gas gradually becomes droplets and the droplet lubrication oil is incorporated into the lubrication oil. In addition, the lubrication oil $L_1$ incorporating the droplet lubrication oil $L_2$ falls into the first pipe portion 46A, and thus, is recovered into the lubrication oil tank 31.

Moreover, in the droplet lubrication oil $L_2$, the droplet lubrication oil, which is incorporated into the cooled lubrication oil $L_1$ flowing downward after being attached to the surface 67a of the filling member 67, exists.

The valve 51 is provided in the first cooling lubrication oil supply line 49. If the valve 51 is opened, the cooled lubrication oil $L_1$ is discharged to the upper end of the first lubrication oil collection portion 63 at a predetermined flow rate. If the valve 51 is closed, the discharging of the cooled lubrication oil $L_1$ to the upper end of the first lubrication oil collection portion 63 is stopped.

In addition, FIG. 1 describes the case where the valve 51 is used. However, an orifice may be used instead of the valve 51.

Figure 5:
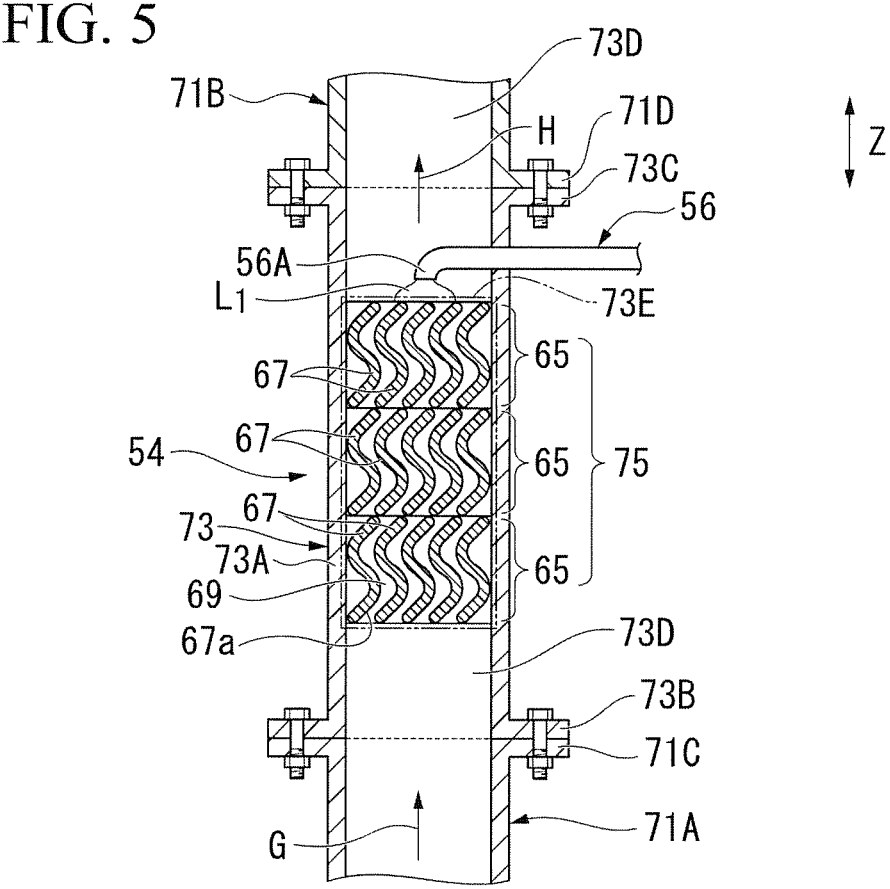
FIG. 5 is an enlarged view showing a portion surrounded by a region B in the oil console equipment shown in FIG. 1 in cross section.

FIG. 5 is an enlarged view showing a portion surrounded by a region B in the oil console equipment shown in FIG. 1 in cross section. In FIG. 5, only a portion of first and second pipe portions 71A and 71B and the second lubrication oil mist collection device 54 are shown in cross section.

In FIG. 5, a reference numeral G indicates a movement direction (hereinafter, referred to as a "G direction") of the second exhaust gas and a reference numeral H indicates a movement direction (hereinafter, referred to an "H direction") of a gas contained in the second exhaust gas. In addition, in FIG. 5, the same reference numerals are assigned to the same constituent portions as those of the structure body shown in FIGS. 1 to 4.

Moreover, FIG. 5 schematically shows a state where the cooled lubrication oil $L_1$ is discharged from a discharge port 56A of the second cooling lubrication oil supply line 56.

Referring to FIGS. 1 and 5, the second atmosphere discharge pipe 53 includes a line body 71 and branch lines 53B to 53D.

The line body 71 includes the first pipe portion 71A, the second pipe portion 71B, and flange portions 71C and 71D.

In the first pipe portion 71A, one end thereof is connected to the bearing 22 and the other end thereof is connected to the second lubrication oil mist collection device 54. A remaining portion of the second exhaust gas generated in the bearing 22 is supplied to the second lubrication oil mist collection device 54 through the first pipe portion 71A.

The second pipe portion 71B is separated from the first pipe portion 71A and is positioned above the first pipe portion 71A. The other end of the second pipe portion 71B becomes an opening end through which a gas can be discharged to the atmosphere.

The flange portion 71C is provided on the other end of the first pipe portion 71A. The flange portion 71D is provided on one end of the second pipe portion 71B. In the first and second pipe portions 71A and 71B, a portion in which the second lubrication oil mist collection device 54 is disposed extends in the Z direction. The gas contained in the second exhaust gas is discharged to the atmosphere via the second lubrication oil mist collection device 54 through the second atmosphere discharge pipe 53.

A branch line 53A branches off from the first pipe portion 71A and a tip end of the branch line 53A is connected to the bearing 23. The remaining portion of the second exhaust gas generated in the bearing 23 is supplied to the second lubrication oil mist collection device 54 via the first pipe portion 71A through the branch line 53A.

A branch line 53B branches off from the first pipe portion 71A positioned on a downstream side of a branching position of the branch line 53A and a tip end of the branch line 53B is connected to the bearing 27. The remaining portion of the second exhaust gas generated in the bearing 27 is supplied to the second lubrication oil mist collection device 54 via the first pipe portion 71A through the branch line 53B.

A branch line 53C branches off from the first pipe portion 71A positioned on a downstream side of a branching position of the branch line 53B and a tip end of the branch line 53C is connected to the bearing 28. The remaining portion of the second exhaust gas generated in the bearing 28 is supplied to the second lubrication oil mist collection device 54 via the first pipe portion 71A through the branch line 53C.

The second lubrication oil mist collection device 54 includes a second tubular member 73 and a second lubrication oil collection portion 75. The second tubular member 73 includes a tubular member body 73A and flange portions 73B and 73C.

The tubular member body 73A is a tubular member having the same inner diameter and outer diameter as an inner diameter and an outer diameter of the line body 71 and extends in one direction. A columnar space 73D is denied inside the tubular member body 73A. The space 73D has a predetermined region 73E in which the second lubrication oil collection portion 75 is disposed. A portion of the space 73D is disposed above and below the predetermined region 73E.

The flange portion 73B is provided on one end of the tubular member body 73A. The flange portion 73B is fastened to the flange portion 71C by a bolt and a nut. The flange portion 73C is provided on the other end of the tubular member body 73A. The flange portion 73C is fastened to the flange portion 71D by a bolt and a nut.

Accordingly, both ends of the tubular member body 73A are coupled to a separate portion (between the first pipe portion 71A and the second pipe portion 71B) of the second atmosphere discharge pipe 53 to extend in the Z direction. In addition, the tubular member body 73A is configured to be attachable or detachable with respect to the second atmosphere discharge pipe 53.

The second lubrication oil collection portion 75 has a configuration similar to that of the above-described first lubrication oil collection portion 63 and is fixed to the predetermined region 73E formed in the second tubular member 73. The second lubrication oil collection portion 75 has a structure in which the collection portions 65 each including a plurality of filling members 67 (in the case, a plurality of second filling members) are stacked. Accordingly, the second lubrication oil collection portion 75 has a function similar to that of the first lubrication oil collection portion 63.

The second cooling lubrication oil supply line 56 branches from the first cooling lubrication oil supply line 49 which is positioned between a branching position of the first cooling lubrication oil supply line 49 and the valve 51. A tip end side of the second cooling lubrication oil supply line 56 penetrates a side wall of the second tubular member 73 partitioning the space 73D positioned above the second lubrication oil collection portion 75.

The second cooling lubrication oil supply line 56 has a discharge port 56A on a tip end positioned in the second tubular member 73. The discharge port 56A is positioned above the upper end of the second lubrication oil collection portion 75. The discharge port 56A through which the cooled lubrication oil $L_1$ is discharged to the upper end of the second lubrication oil collection portion 75 (the state shown in FIG. 5).

Since the second lubrication oil mist collection device 54 and the second cooling lubrication oil supply line 56 configured as described above are provided, it is possible to enhance a probability that the cooled liquid lubrication oil $L_1$ moving downward while being attached to the surface (the surfaces 67a of the plurality of filling members 67) of the second lubrication oil collection portion 75 when the cooled liquid lubrication oil $L_1$ is discharged from the upper end side of the second lubrication oil collection portion 75 and the second exhaust gas (gas) come into gas-liquid contact with each other.

Accordingly, since most of the second exhaust gas is cooled by the cooled liquid lubrication oil $L_1$, most of the lubrication oil mist contained in the second exhaust gas can be made into droplets, and thus, it is possible to increase recovery efficiency of the lubrication oil mist contained in the second exhaust gas.

In addition, since the lubrication oil $L_1$ supplied to the upper end of the second lubrication oil collection portion 75 is cooled using the first cooler 37 which cools the lubrication oil $L_1$ supplied to the bearing, it is possible to cool the lubrication oil $L_1$ which cools the second exhaust gas by only providing the second cooling lubrication oil supply line 56 without providing a cooler separately.

The valve 58 is provided in the second cooling lubrication oil supply line 56. If the valve 58 is opened, the cooled liquid lubrication oil $L_1$ is discharged to the upper end of the second lubrication oil collection portion 75 by a predetermined amount. If the valve 58 is closed, the discharging of the cooled lubrication oil $L_1$ to the upper end of the second lubrication oil collection portion 75 is stopped.

In addition, FIG. 1 describes the case where the valve 58 is used. However, an orifice may be used instead of the valve 58.

According to the oil console equipment 12 of the first embodiment, since the first lubrication oil mist collection device 48 and the first cooling lubrication oil supply line 49 configured as described above are provided, it is possible to enhance a probability that the cooled lubrication oil $L_1$ moving toward the lower portion of the first lubrication oil collection portion 63 while being attached to the surface (the surfaces 67a of the plurality of filling members 67) of the first lubrication oil collection portion 63 when the cooled liquid lubrication oil $L_1$ is supplied from the upper end side of the first lubrication oil collection portion 63 and the first exhaust gas (gas) come into gas-liquid contact with each other.

Accordingly, since most of the first exhaust gas is cooled by the cooled liquid lubrication oil $L_1$, most of the lubrication oil mist contained in the first exhaust gas can be made into droplets, and thus, it is possible to increase recovery efficiency of the lubrication oil mist contained in the first exhaust gas.

In addition, since the lubrication oil $L_1$ supplied to the upper end of the first lubrication oil collection portion 63 is cooled using the first cooler 37, it is possible to cool the liquid lubrication oil $L_1$ by providing only the first cooling lubrication oil supply line 49 branching off from the lubrication oil recovery line without providing a cooler separately.

In addition, the liquid lubrication oil $L_1$ having a low temperature due to cooling is supplied from the upper end of the first lubrication oil collection portion 63, the gas (for example, a vent gas at approximately 60° C. to 70° C.) is positively cooled by the liquid lubrication oil $L_1$, and the temperature of the gas decreases. Accordingly, by returning the gas of the lubrication oil $L_1$ which became unable to exist as a gas due to gas-liquid equilibrium to a liquid state and attaching the lubrication oil mist which is extremely fine and could not be removed so far, the mist diameter of the lubrication oil $L_1$ increases so that it can be removed.

Figure 6:
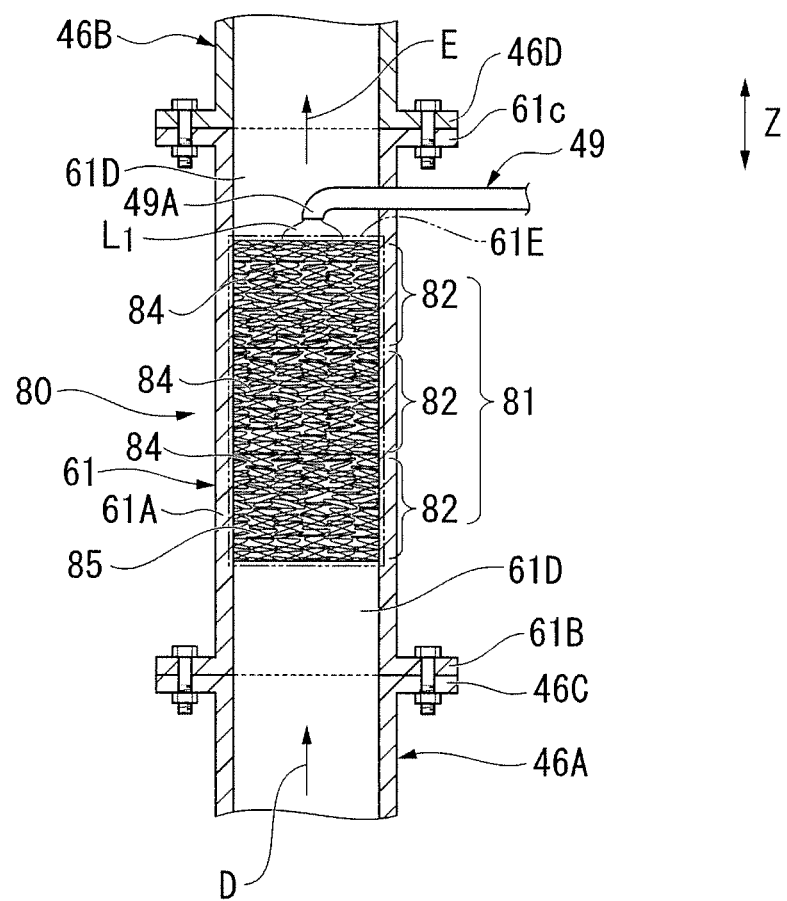
FIG. 6 is a sectional view of a first lubrication oil mist collection device according to a modification example of the first embodiment.

FIG. 6 is a sectional view of a first lubrication oil mist collection device according to a modification example of the first embodiment. In FIG. 6, the same reference numerals are assigned to the same constituent portions as those of the structure body shown in FIG. 2.

Referring to FIG. 6, a first lubrication oil mist collection device 80 according to a first modification example of the first embodiment is configured to be similar to the first lubrication oil mist collection device 48 except that a first lubrication oil collection portion 81 is provided instead of the first lubrication oil collection portion 63 constituting the first lubrication oil mist collection device 48 shown in FIG. 2.

The first lubrication oil collection portion 81 has a structure in which three collection portions 82 filled with a plurality of fibrous metal members 84 (a plurality of first filling members) are stacked.

The plurality of fibrous metal members 84 are disposed in the predetermined region 61E in a state where the gaps 85 are interposed therebetween such that an upper end side of the first lubrication oil collection portion 81 is not viewed when viewed from a lower end side of the first lubrication oil collection portion 81. For example, as the plurality of fibrous metal members 84, stainless steel wool can be used.

According to the first lubrication oil mist collection device 80 of the modification example of the first embodiment, compared to the case where the plate-shaped members are used, since the first lubrication oil mist collection device 80 includes the plurality of fibrous metal members 84, it is possible to increase flow paths through which the cooled liquid lubrication oil $L_1$ moves.

Accordingly, since it is possible to enhance a probability that the cooled liquid lubrication oil $L_1$ and the first exhaust gas come into gas-liquid contact with each other, it is possible to further increase the recovery efficiency of the lubrication oil mist contained in the first exhaust gas.

In addition, instead of three collection portions 65 constituting the second lubrication oil mist collection device 54 shown in FIG. 5, three collection portions 82 shown in FIG. 6 may be stacked and used.

In addition, each of the first and second lubrication oil mist collection devices 48 and 54 may be configured by combining the collection portion 65 and the collection portion 82. That is, the collection portions 65 and 82 having configurations different from each other may be combined.

Figure 7:
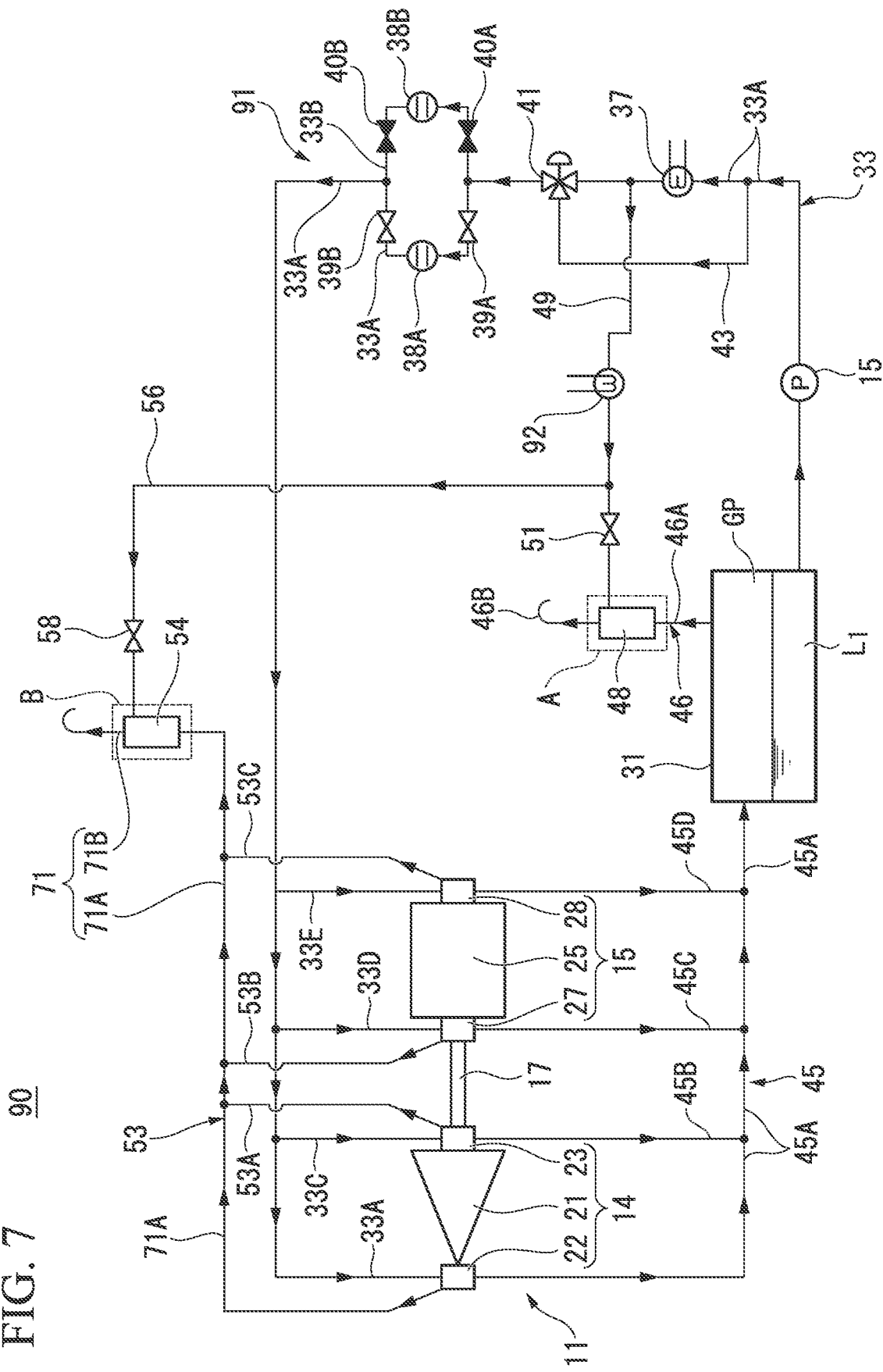
FIG. 7 is a diagram schematically showing a schematic configuration of oil console equipment according to a modification example of the first embodiment of the present invention.

FIG. 7 is a diagram schematically showing a schematic configuration of a rotary machine provided with oil console equipment according to a modification example of the first embodiment of the present invention. In FIG. 7, the same reference numerals are assigned to the same constituent portions as those of the structure body shown in FIG. 1.

Referring to FIGS. 2, 5, and 7, a rotary machine 90 provided with oil console equipment according to the modification example of the first embodiment is configured to be similar to the rotary machine 10 provided with oil console equipment except that oil console equipment 91 is provided instead of the oil console equipment 12 constituting the rotary machine 10 provided with oil console equipment of the first embodiment.

In the oil console equipment 91, a second cooler 92 is further provided in the configuration of the oil console equipment 12.

The second cooler 92 is provided in the first cooling lubrication oil supply line 49 positioned on an upstream side of a branching position of the second cooling lubrication oil supply line 56. The second cooler 92 cools the liquid lubrication oil $L_1$ cooled by the first cooler 37, and thus, it is possible to further decrease the temperature of the liquid lubrication oil $L_1$.

The liquid lubrication oil $L_1$ cooled by the first and second coolers 37 and 92 is supplied to the upper ends of the first and second lubrication oil collection portions 63 and 75 via the valves 51 and 58.

According to the oil console equipment 91 of the modification example of the first embodiment, since the oil console equipment 91 includes the second cooler 92 which is provided in the first cooling lubrication oil supply line 49 positioned on the upstream side of the branching position of the second cooling lubrication oil supply line 56, it is possible to further decrease the temperature of the liquid lubrication oil $L_1$ which cools the first and second exhaust gases.

Accordingly, since the lubrication oil mist contained in the first and second exhaust gases more easily becomes droplets, it is possible to further increase the recovery efficiency of the lubrication oil mist.

Figure 8:
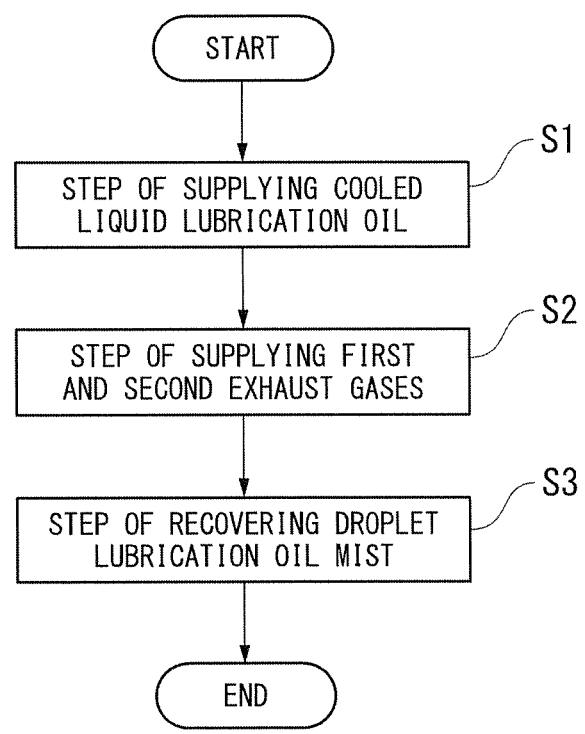
FIG. 8 is a flowchart explaining a method for recovering a lubrication oil contained in an exhaust gas according to the first embodiment of the present invention.

FIG. 8 is a flowchart explaining a method for recovering a lubrication oil contained in an exhaust gas according to the first embodiment of the present invention.

Referring to FIGS. 1 to 5, the method for recovering a lubrication oil contained in an exhaust gas according to the first embodiment will be described. Here, for example, in the case where the rotary machine 10 provided with oil console equipment shown in FIG. 1 is used, the method for recovering a lubrication oil contained in an exhaust gas will be described.

If processing shown in FIG. 8 starts, in S1, the pump 35 is driven, and the liquid lubrication oil $L_1$ introduced out from the lubrication oil tank 31 is cooled by the first cooler 37. In a case where the temperature of the liquid lubrication oil $L_1$ in the lubrication oil tank 31 is approximately 60° C., for example, the temperature of the cooled liquid lubrication oil $L_1$ can be approximately 45° C.

Next, the valves 51 and 58 are opened, the cooled liquid lubrication oil $L_1$ is supplied to the first and second cooling lubrication oil supply lines 49 and 56 positioned at rear stages of the valves 51 and 58. Accordingly, the cooled liquid lubrication oil $L_1$ is supplied to the upper ends of the first and second lubrication oil collection portions 63 and 75.

Next, in S2, the lubrication oil mist which is the misted lubrication oil $L_1$ and the first exhaust gas containing the gas are introduced into the first atmosphere discharge pipe 46 from a gas phase in the lubrication oil tank 31, and the lubrication oil mist which is the misted lubrication oil and the second exhaust gas containing the gas are introduced from the bearings 22, 23, 27, and 28 into the second atmosphere discharge pipe 53.

Next, the first exhaust gas is supplied from the lower end side of the first lubrication oil collection portion 63 to the first lubrication oil collection portion 63, and the second exhaust gas is supplied from the lower end side of the second lubrication oil collection portion 75 to the second lubrication oil collection portion.

Next, in S3, the lubrication oil mist contained in the first and second exhaust gases is recovered. Specifically, the cooled liquid lubrication oil $L_1$ moving from the upper end of the first lubrication oil collection portion 63 to the lower end side and the first exhaust gas come into gas-liquid contact with each other, the lubrication oil mist contained in the first exhaust gas becomes droplets, the droplet lubrication oil $L_2$ is incorporated into the liquid lubrication oil $L_1$, the liquid lubrication oil $L_1$ is recovered, and thus, the lubrication oil mist contained in the first exhaust gas is recovered. In this case, the gas contained in the first exhaust gas passes through the first lubrication oil collection portion 63, and thereafter, moves in the E direction so as to be discharged to the atmosphere.

In addition, the cooled liquid lubrication oil $L_1$ moving from the upper end of the second lubrication oil collection portion 75 to the lower end side and the second exhaust gas come into gas-liquid contact with each other, the lubrication oil mist contained in the second exhaust gas becomes droplets, the droplet lubrication oil $L_2$ is incorporated into the liquid lubrication oil $L_1$, the liquid lubrication oil $L_1$ is recovered, and thus, the lubrication oil mist contained in the second exhaust gas is recovered. In this case, the gas contained in the second exhaust gas passes through the second lubrication oil collection portion 75, and thereafter, moves in the H direction so as to be discharged to the atmosphere.

According to the method for recovering a lubrication oil contained in an exhaust gas of the first embodiment, using the above-described method, it is possible to enhance a probability that the cooled liquid lubrication oil $L_1$ moving toward the lower sides of the first and second lubrication oil collection portions 63 and 75 while being attached to the surfaces of the first and second lubrication oil collection portions 63 and 75 when the cooled lubrication oil $L_1$ is supplied from the upper end sides of the first and second lubrication oil collection portions 63 and 75 and the first exhaust gas (gas) come into gas-liquid contact with each other.

Therefore, since most of the first and second exhaust gases are cooled by the cooled lubrication oil $L_1$, most of the lubrication oil mist contained in the first and second exhaust gases can be made into droplets so as to be recovered. That is, it is possible to enhance recovery efficiency of the lubrication oil mist contained in the first and second exhaust gases.

In addition, the method for recovering a lubrication oil contained in an exhaust gas using the oil console equipment 91 according to the modification example of the first embodiment can be performed by a similar method as the method for recovering lubrication oil contained in an exhaust gas of the above-described first embodiment except that the liquid lubrication oil $L_1$ is cooled using the first and second coolers 37 and 92.

Second Embodiment

Figure 9:
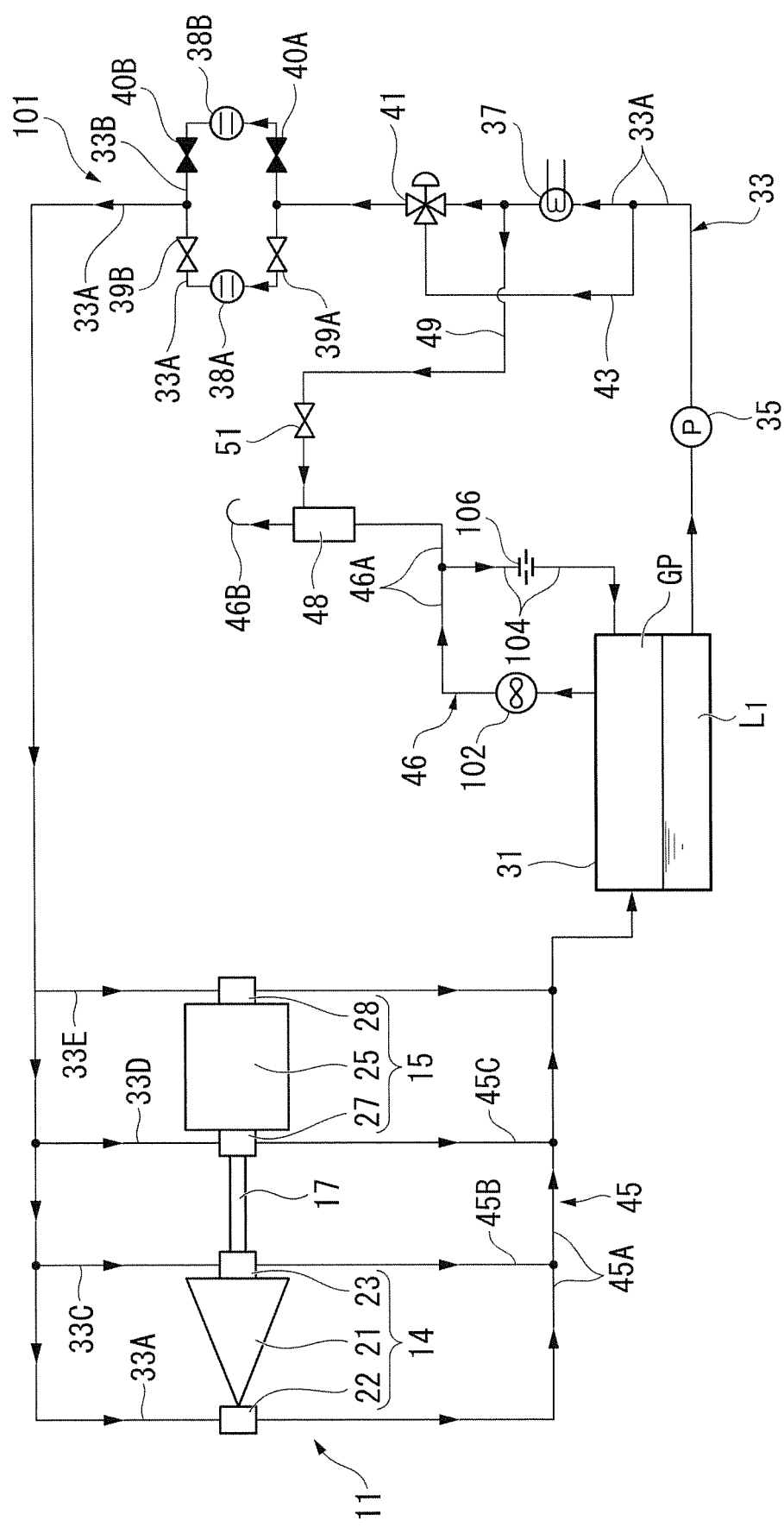
FIG. 9 is a diagram schematically showing a schematic configuration of a rotary machine provided with oil console equipment according to a second embodiment of the present invention.

FIG. 9 is a diagram schematically showing a schematic configuration of a rotary machine provided with oil console equipment according to a second embodiment of the present invention. In FIG. 9, the same reference numerals are assigned to the same constituent portions as those of the structure body shown in FIG. 1.

Referring to FIG. 9, a rotary machine 100 provided with oil console equipment of the second embodiment is configured to be similar to the rotary machine 10 provided with oil console equipment except that oil console equipment 101 is provided instead of the oil console equipment 12 constituting the rotary machine 10 provided with oil console equipment of the first embodiment.

The oil console equipment 101 is configured to be similar to the oil console equipment 12 except that a fan 102, a lubrication oil mist recovery line 104, and an orifice 106 are provided instead of the second atmosphere discharge pipe 53, the second lubrication oil mist collection device 54, the second cooling lubrication oil supply line 56, and the valve 58 constituting the oil console equipment 12 of the first embodiment.

The fan 102 is provided in the first atmosphere discharge pipe 46. The fan 102 introduces the first exhaust gas existing in the gas phase GP in the lubrication oil tank 31 into the first atmosphere discharge pipe 46 and introduces the second exhaust gas generated in the bearings 22, 23, 27, and 28 into the first atmosphere discharge pipe 46 via the lubrication oil recovery line 45 and the lubrication oil tank 31.

Since the fan 102 configured as described above is provided, the second atmosphere discharge pipe 53, the second lubrication oil mist collection device 54, the second cooling lubrication oil supply line 56, and the valve 58 described in the first embodiment are not necessary, and a configuration of the oil console equipment 101 can be simplified.

The lubrication oil mist recovery line 104 branches off from the first atmosphere discharge pipe 46 positioned between the fan 102 and the first lubrication oil mist collection device 48, and a tip end of the lubrication oil mist recovery line 104 is connected to the upper portion of the lubrication oil tank 31. The lubrication oil mist recovery line 104 is a line which passes through a portion of the first pipe portion 46A and recovers the lubrication oil $L_1$ containing the droplet lubrication oil $L_2$ shown in FIG. 4.

The orifice 106 is provided in the lubrication oil mist recovery line 104.

In this way, since the lubrication oil mist recovery line 104 branching off from the first atmosphere discharge pipe 46 positioned between the fan 102 and the first lubrication oil mist collection device 48 and the orifice 106 provided in the lubrication oil mist recovery line 104 are provided, it is possible to recover the lubrication oil $L_1$ containing the droplet lubrication oil $L_2$ in the lubrication oil tank 31 without passing through the fan 102.

According to the oil console equipment 101 of the second embodiment, it is possible to obtain effects similar to those of the oil console equipment 12 of the above-described first embodiment with a simplified structure.

In addition, in the oil console equipment 101 of the second embodiment, the second cooler 92 shown in FIG. 7 may be provided in the first cooling lubrication oil supply line 49 positioned at the front stage of the valve 51.

In addition, in the second embodiment, the first lubrication oil mist collection device 48 may be configured using the collection portion 82 shown in FIG. 6.

A method for recovering a lubrication oil contained in an exhaust gas using the rotary machine 100 provided with oil console equipment of the above-described second embodiment can be performed by a method similar to the method for recovering a lubrication oil contained in an exhaust gas of the above-described first embodiment except that the first and second exhaust gases are supplied to the first lubrication oil collection portion 63 (refer to FIG. 2) using the fan 102 provided in the first atmosphere discharge pipe 46 in the above-described step of supplying the first exhaust gas, and the cooled lubrication oil $L_1$ containing the droplet lubrication oil mist is recovered via the lubrication oil mist recovery line 104 branching off from the first atmosphere discharge pipe 46 positioned between the first tubular member 61 (refer to FIG. 3) and the fan 102 in the above-described step of recovering the lubrication oil mist.

INDUSTRIAL APPLICABILITY

The present invention can be applied to oil console equipment, a rotary machine provided with oil console equipment, and a method for recovering a lubrication oil contained in an exhaust gas capable of increasing recovery efficiency of a misted lubrication oil contained in an exhaust gas passing through an atmosphere discharge pipe.

REFERENCE SIGNS LIST

10, 90, 100: rotary machine provided with oil console equipment
11: rotary machine
12, 91, 101: oil console equipment
14: driver
15: compressor
17: rotary shaft
21: driver body
25: compressor body
22, 23, 27, 28: bearing
31: lubrication oil tank
33: lubrication oil supply line
33A, 45A, 71: line body
33B to 33E, 45B to 45D, 53A to 53C: branch line 35: pump
37: first cooler
38A, 38B: filter
39A, 39B, 40A, 40B, 51, 58: valve
41: temperature control valve
43: bypass line
45: lubrication oil recovery line
46: first atmosphere discharge pipe
46A, 71A: first pipe portion
46B, 71B: second pipe portion
46C, 46D, 61B, 61C, 71C, 71D, 73B, 73C: flange portion
48, 80: first lubrication oil mist collection device
49: first cooling lubrication oil supply line
49A, 56A: discharge port
53: second atmosphere discharge pipe
54: second lubrication oil mist collection device
56: second cooling lubrication oil supply line
61: first tubular member
61A, 73A: tubular member body
61D, 73D: space
61E, 73E: predetermined region
63, 81: first lubrication oil collection portion
65, 82: collection portion
67: filling member
67a: surface
69, 85: gap
73: second tubular member
75: second lubrication oil collection portion
84: fibrous metal member
92: second cooler
102: fan
104: lubrication oil mist recovery line
106: orifice
A, B: region
D, E, F, G, H: direction
GP: gas phase
$L_1$: lubrication oil
$L_2$: droplet lubrication oil

The invention claimed is:

1. Oil console equipment comprising:
a lubrication oil tank in which a lubrication oil is stored;
a lubrication oil supply line which is connected to the lubrication oil tank and through which a liquid lubrication oil stored in the lubrication oil tank is supplied to a bearing supporting a rotor;
a first cooler which is provided in the lubrication oil supply line and cools the liquid lubrication oil supplied to the bearing;
a lubrication oil recovery line which is connected to the lubrication oil tank and through which the lubrication oil recovered from the bearing is introduced into the lubrication oil tank;
a first atmosphere discharge pipe which is connected to the lubrication oil tank and through which a lubrication oil mist which exists in a gas phase in the lubrication oil tank and is a misted lubrication oil and a first exhaust gas containing a gas are introduced out;
a first lubrication oil mist collection device which includes a first tubular member which is provided in a state of being coupled to the first atmosphere discharge pipe and extends in a vertical direction and a first lubrication oil collection portion which is disposed in a space formed in the first tubular member to collect the lubrication oil mist and through which the gas is capable of passing; and
a first cooling lubrication oil supply line which branches off from the lubrication oil supply line positioned on a downstream side of the first cooler and includes a discharge port disposed in the first tubular member and through which a cooled liquid lubrication oil is supplied to an upper end of the first lubrication oil collection portion via the discharge port without being injected or sprayed,
wherein the first lubrication oil collection portion includes a plurality of first filling members obtained by curving a plate material in a wavelike shape,
wherein the plurality of first filling members extend in a direction intersecting the vertical direction and are disposed in a state where gaps through which a gas is capable of passing in a plane direction orthogonal to the vertical direction are interposed therebetween, and
wherein the first lubrication oil collection portion causes the cooled liquid lubrication oil moving toward a lower side of the filling member in a state of being attached to a surface of the first filling member and the first exhaust gas passing through the gap and moving from an lower end of the first lubrication oil collection portion to an upper end thereof to come into gas-liquid contact with each other.

2. The oil console equipment according to claim 1,
wherein the first lubrication oil collection portion includes a plurality of first filling members, and
wherein the plurality of first filling members are disposed in the space in the first tubular member in a state where a gap is interposed therebetween such that the upper end side of the first lubrication oil collection portion is not viewed when viewed from the lower end side of the first lubrication oil collection portion.

3. The oil console equipment according to claim 1, further comprising:
a second cooler which is provided in the first cooling lubrication oil supply line and further cools the lubrication oil cooled by the first cooler.

4. The oil console equipment according to claim 1, further comprising:
a fan which is provided in the first atmosphere discharge pipe positioned between the lubrication oil tank and the first lubrication oil mist collection device;
a lubrication oil mist recovery line which branches off from the first atmosphere discharge pipe positioned between the first lubrication oil mist collection device and the fan and is connected to the lubrication oil tank; and
an orifice which is provided in the lubrication oil mist recovery line.

5. The oil console equipment according to claim 1, further comprising:
a second atmosphere discharge pipe which is connected to the bearing and through which a lubrication oil mist which is a misted lubrication oil and a second exhaust gas containing a gas are discharged to the atmosphere;
a second lubrication oil mist collection device which includes a second tubular member having both ends coupled to a separate portion of the second atmosphere discharge pipe and a second lubrication oil collection portion which is disposed in a predetermined region of a space formed in the second tubular member to collect the lubrication oil mist and through which the gas is capable of passing; and
a second cooling lubrication oil supply line which branches off from the first cooling lubrication oil supply line and includes a discharge port disposed in the second tubular member and through which the cooled liquid lubrication oil is supplied to an upper end of the second lubrication oil collection portion via the discharge port.

6. The oil console equipment according to claim 5,
wherein the second lubrication oil collection portion includes a plurality of second filling members, and
wherein the plurality of second filling members are disposed in a predetermined region in the second tubular member in a state where a gap is interposed therebetween such that the upper end side of the second lubrication oil collection portion is not viewed when viewed from a lower end side of the second lubrication oil collection portion.

7. The oil console equipment according to claim 5,
wherein a second cooler is provided in the first cooling lubrication oil supply line, and
wherein the second cooling lubrication oil supply line branches off from the first cooling lubrication oil supply line positioned between the first lubrication oil mist collection device and the second cooler.

8. A rotary machine provided with oil console equipment, comprising:
the oil console equipment according to claim 1; and
a rotary machine which includes the rotor and the bearing.

9. A method for recovering a lubrication oil contained in an exhaust gas in oil console equipment, comprising:
a step of cooling the liquid lubrication oil introduced out from a lubrication oil tank in which a lubrication oil is stored and supplying the cooled liquid lubrication oil from an upper end side of a first lubrication oil collection portion without being injected or sprayed, which fills a predetermined region of a space in a first tubular member coupled to a first atmosphere discharge pipe connected to a gas phase of the lubrication oil tank and includes a plurality of first filling members which are configured by curving a plate material in a wavelike form and extends in a direction intersecting a vertical direction, into the first lubrication oil collection portion;
a step of introducing a lubrication oil mist which is a misted lubrication oil and a first exhaust gas containing a gas from a gas phase in the lubrication oil tank into the first atmosphere discharge pipe, and supplying the first exhaust gas from a lower end side of the first lubrication oil collection portion to the first lubrication oil collection portion; and
a step of causing the cooled liquid lubrication oil moving toward a lower side of the first filling member in a state of being attached to a surface of the first filling member and the first exhaust gas to come into gas-liquid contact with each other in the first lubrication oil collection portion, forming droplets of the lubrication oil mist contained in the first exhaust gas to recover the lubrication oil mist, and causing the gas contained in the first exhaust gas to pass through the upper end side of the first lubrication oil collection portion.

10. The method for recovering a lubrication oil contained in an exhaust gas according to claim 9,
wherein in the step of supplying the first exhaust gas, the first exhaust gas is supplied to the first lubrication oil collection portion using a fan provided in the first atmosphere discharge pipe, and
wherein in the step of recovering the lubrication oil mist, the cooled lubrication oil containing the lubrication oil mist is recovered via a lubrication oil mist recovery line which branches off from the first atmosphere discharge pipe positioned between the first lubrication oil collection portion and the fan.

11. The method for recovering a lubrication oil contained in an exhaust gas according to claim 9, further comprising:
a step of cooling the liquid lubrication oil introduced out from the lubrication oil tank in which a lubrication oil is stored and supplying a portion of the cooled liquid lubrication oil from an upper end side of a second lubrication oil collection portion, which fills a predetermined region of a space formed in a second tubular member coupled to a second atmosphere discharge pipe connected to a bearing, into the second lubrication oil collection portion;
a step of introducing the lubrication oil mist which is the misted lubrication oil and a second exhaust gas containing a gas from the bearing into the second atmosphere discharge pipe, and supplying the second exhaust gas from a lower end side of the second lubrication oil collection portion to the second lubrication oil collection portion; and
a step of causing the cooled liquid lubrication oil and the second exhaust gas to come into gas-liquid contact with each other in the second lubrication oil collection portion, forming droplets of the lubrication oil mist contained in the second exhaust gas to recover the lubrication oil mist, and causing the gas contained in the second exhaust gas to pass through the upper end side of the second lubrication oil collection portion.

\* \* \* \* \*